United States Patent
Panemangalore et al.

(10) Patent No.: US 9,805,717 B2
(45) Date of Patent: *Oct. 31, 2017

(54) VOICE-BASED INPUT USING NATURAL LANGUAGE PROCESSING FOR INTERFACING WITH ONE OR MORE DEVICES

(71) Applicant: DELL PRODUCTS L.P., Round Rock, TX (US)

(72) Inventors: Sachinrao Panemangalore, San Jose, CA (US); Vinay Sawal, Fremont, CA (US); Vivek Dharmadhikari, San Jose, CA (US); Kuntal Patel, Milpitas, CA (US); Gavin Richard Cato, Los Gatos, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/668,850

(22) Filed: Mar. 25, 2015

(65) Prior Publication Data

US 2016/0260430 A1 Sep. 8, 2016

Related U.S. Application Data

(63) Continuation-in-part of application No. 14/641,148, filed on Mar. 6, 2015.

(51) Int. Cl.
*G10L 15/22* (2006.01)
*G10L 15/18* (2013.01)
(Continued)

(52) U.S. Cl.
CPC .......... *G10L 15/1822* (2013.01); *G06F 3/167* (2013.01); *G06F 17/289* (2013.01); *G10L 15/26* (2013.01); *G10L 2015/223* (2013.01)

(58) Field of Classification Search
CPC . G10L 15/26; G10L 15/265; G10L 2015/228; G10L 2015/223; G06F 3/167
See application file for complete search history.

(56) References Cited

U.S. PATENT DOCUMENTS 6,070,133 A * 5/2000 Brewster .............. G06K 9/6217
704/9
2010/0082333 A1* 4/2010 Al-Shammari ..... G06F 17/2735
704/10

(Continued)

OTHER PUBLICATIONS

Arista at-a-glance, "EOS CloudVision ," 2015 (2pgs).
(Continued)

*Primary Examiner* — Douglas Godbold
*Assistant Examiner* — Mark Villena
(74) *Attorney, Agent, or Firm* — North Weber & Baugh LLP

(57) ABSTRACT

Aspects of the present invention provide a more universal, easy, natural, and vendor-agnostic interface to configure, manage, and/or monitor devices in networks. In embodiments, a user-friendly natural language interface voice interface may be used to "live chat" with one or more devices. In embodiments, a natural language input from a user intended for a target device is received and converted into one or more properly formed commands that are target-specific for the target device and may be executed by the target device. In embodiments, results from the execution of the one or more commands may be appropriately formatted for presentation to the user.

20 Claims, 11 Drawing Sheets

(51) Int. Cl.
*G06F 3/16* (2006.01)
*G06F 17/28* (2006.01)
*G10L 15/26* (2006.01)

(56) References Cited

U.S. PATENT DOCUMENTS

| | | | | |
|---|---|---|---|---|
| 2012/0089394 | A1* | 4/2012 | Teodosiu | G06F 17/2785 |
| | | | | 704/235 |
| 2013/0268260 | A1* | 10/2013 | Lundberg | G06F 17/28 |
| | | | | 704/8 |
| 2014/0106734 | A1* | 4/2014 | Lee | H04W 4/008 |
| | | | | 455/419 |
| 2014/0136187 | A1* | 5/2014 | Wolverton | G06F 17/30654 |
| | | | | 704/9 |
| 2014/0214904 | A1* | 7/2014 | Ims | G06Q 30/01 |
| | | | | 707/805 |
| 2015/0348554 | A1 | 12/2015 | Orr | |
| 2016/0225371 | A1 | 8/2016 | Agrawal | |

OTHER PUBLICATIONS

Non-Final Office Action mailed Jul. 20, 2016, in U.S. Appl. No. 14/641,148 (18 pgs).
Response to Non-Final Office Action dated Oct. 20, 2016, in U.S. Appl. No. 14/641,148 (19 pgs).
Non-Final Office Action dated Feb. 10, 2017, in U.S. Appl. No. 14/641,148, filed Mar. 6, 2015 (13 pgs).
Notice of Allowance and Fees Due dated Jun. 29, 2017, U.S. Appl. No. 14/641,148, filed Mar. 6, 2015 (10 pgs).

* cited by examiner

VOICE-BASED INPUT USING NATURAL LANGUAGE PROCESSING FOR INTERFACING WITH ONE OR MORE DEVICES

CROSS-REFERENCE TO RELATED APPLICATION

This patent application claims priority to and is a continuation-in-part of co-pending and commonly-owned U.S. patent application Ser. No. 14/641,148, filed on Mar. 6, 2015, entitled "NATURAL LANGUAGE PROCESSING (NLP) INTERFACING WITH DEVICES," listing Sachinrao Panemangalore, Vinay Sawal, Vivek Dharmadhikari, Kuntal Patel, and Gavin Cato as inventors, which patent document is incorporated by reference herein in its entirety and for all purposes.

TECHNICAL FIELD

The present disclosure relates to information handling systems, such as networking devices. More particularly, the present disclosure related to systems and methods for improving the ease of interfacing with one or more information handling systems.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Ever increasing demands for data and communications have resulted in vast arrays of ever expanding networks. As these networks expand, new equipment is added at different times and for different reasons, such as to add new functionality and features. One result of such expansions is a heterogeneous mix of different networking equipment from a plurality of vendors. This patchwork of increasingly complex equipment makes it increasingly more complex for network administrators to configure, manage, and maintain.

For example, before networking equipment is operational in data center, it has to be initially configured. Possible solutions are bare metal provisioning (BMP) and/or manually bring up each device. However, BMP is not an easy solution and manually bringing up each device is neither efficient nor desirable.

Furthermore, as noted above, a typical data center often comprises multi-vendor networking equipment. Therefore, beyond the first-time configuration issues, every vendor has its own set of command line interfaces (CLIs) or application programming interfaces (APIs) that the administrator must know and use in order to configure the devices. Having to be conversant in several different vendor-specific CLIs/APIs requires a highly knowledgeable, and typically highly paid, network administration staff. Because network administration staff may be more familiar with certain vendors' configuration and maintenance requirements, they are likely to be more inclined to suggest or buy those vendors' equipment. Similarly, when a different vendor releases equipment with unique features, administrators may be hesitant to purchase the equipment, despite its unique offerings, because they do not possess the necessary expertise for operating that vendor's equipment, to reduce operational cost of having to train personnel, or both. Thus, the learning curve to learn a new vendor's configuration language/syntax can become a substantial hurdle both to the data center owners who want to introduce new equipment into their systems and to equipment sellers who want to win new customers.

Other problems exist when customers want to make changes "on the fly." For example, if a customer wants to change a small, on-the-fly configuration, he or she may opt to use/edit automation framework or follow a configuration guide. Both solutions involve a significant time-money tradeoff—including time spent searching the configuration guide, increased chance of human error, etc.

Accordingly, what is needed are systems and methods that allow for more universal, easy, natural, and vendor-agnostic interface to configure and interface with devices in networks.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
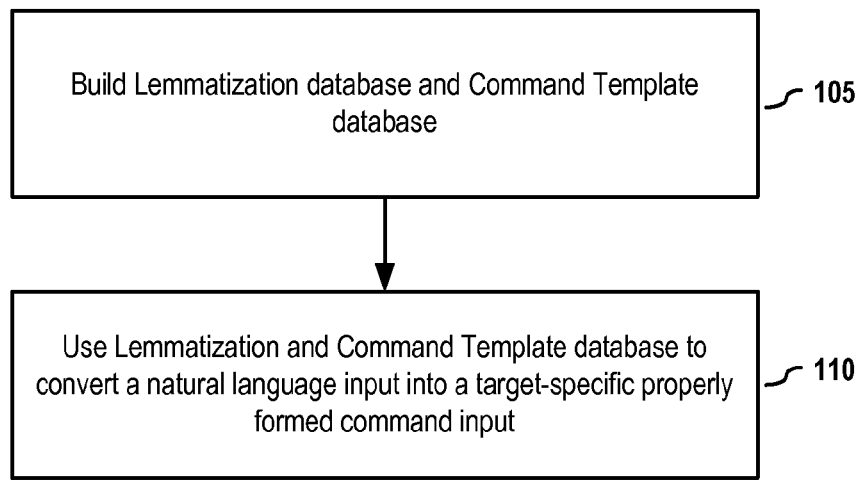
FIG. 1 depicts a method for generating and using a natural language processing (NLP) device configuration system according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "packet," "datagram," "segment," or "frame" shall be understood to mean a group of bits that can be transported across a network. These terms shall not be interpreted as limiting embodiments of the present invention to particular layers (e.g., Layer 2 networks, Layer 3 networks, etc.); and, these terms along with similar terms such as "data," "data traffic," "information," "cell," etc. may be replaced by other terminologies referring to a group of bits, and may be used interchangeably.

Furthermore, it shall be noted that: (1) certain steps may optionally be performed; (2) steps may not be limited to the specific order set forth herein; (3) certain steps may be performed in different orders; and (4) certain steps may be done concurrently.

A. General Overview

Aspects of the present invention provide a more universal, easy, natural, and vendor-agnostic interface to configure and interface with devices in networks.

In embodiments, a single point of administration, management, and monitoring across a network, such as an entire data center, can provide a user-friendly natural language interface. For example, in embodiments, a voice-based chat or messaging interface may be used to "live chat" with networking devices using messaging and presence protocol or protocols, such as XMPP (Extensible Messaging and Presence Protocol (XMPP) protocol. In embodiments, such messaging and presence protocols create a shared bus over which networking devices can be configured, managed, and/or monitored using traditional command line interfaces (CLIs). Furthermore, a voice-input chat or messenger-like utility may be used to interface with one or a group of devices—giving almost human-like behavior to network devices. It shall be noted that other interface types also may be used.

FIG. 1 depicts a high-level methodology for using a natural language processing (NLP) interface system according to embodiments of the present invention. In embodiments, the methodology comprises two main steps, a training phase and a use phase. In embodiments, the training phase comprises building (105) a lemmatization database and a command template database. Once the lemmatization and command template databases have been generated, these databases may be used (110) to convert a natural language input, such as a configuration, management, or monitoring request, into a domain-specific, properly formed command input.

As one skilled in the art shall recognize, such an NLP system has at least a few unique and important features. Typical NLP systems merely convert natural language into text queries. Such natural language processing is almost exclusively concerned with merely trying to extract the most salient keywords. These NLP systems are not concerned with converting the free-form input into a very strict output format that exactly matches a proper syntax, form, structure, semantics, variables, and attributes of configuration commands. To add further complexity, the proper syntax, form, structure, semantics, variables, and attributes are different between vendors. That is, even though different vendors provide the same or very similar functionality, the form, syntax, variables, semantics, etc. that the vendors use can vary dramatically. Thus, unlike typical NLP system, the same NLP input would need to output a very different CLI/API request depending upon the target device.

Consider, by way of illustration, the problem related to a fairly common networking feature of link aggregation group (LAG). Related to this technology, Dell Force 10 markets Port-Channel, Link Aggregation Group (LAG), and Virtual Link Trunking (VLT). Cisco markets EtherChannel, Port Aggregation, Virtual Switching System (VSS), virtual PortChannel (vPC), Multichassis EtherChannel (MEC), and Multichassis Link Aggregation (MLAG). Avaya markets Multi-Link Trunking (MLT), Split Multi-Link Trunking (SMLT), Routed Split Multi-Link Trunking (RSMLT), and Distributed Split Multi-Link Trunking (DSMLT). ZTE markets "Smartgroup" and Huawei markets "EtherTrunks." Other vendors provide similar offerings, often under different names. Thus, an input of "LAG" by a user must not only be recognized by a robust NLP system as a term of art (i.e., not meaning the English term for "falling behind" but rather that it related to distributed resilient network interconnection (DRNI)) and also correlate that term to a specific target device (e.g., Multi-Link Trunking for an Avaya target device).

B. Indexing/Database Generation

1. Generation of Lemmatization Database (Query Transformation Index)

In embodiments, a lemmatization database DB (or query transformation index) is consulted by an NLP system for transforming an NLP input (or NLP query, which may be used interchangeably herein) from using a source vocabulary to a destination vocabulary. For example, an NLP query which uses Arista or Juniper terminology would be transformed to Dell switching terminology.

In embodiments, a lemmatization database is a collection of structured records, which at the inner most level comprises a list of commands. In embodiments, each command is associated with Name, Description, and list of Synonyms. Presented below is an example format of a structured record, although it shall be noted that other formats and content may be used:

```
Vendor_Set:
[{ Vendor:"Vendor1"
    Product_Set:[{ Product:"product1",
        Command_Set:[ { Name:"command1 ,
            Description:"description details",
            [Synonyms:"command2", "command3" .....]
            } ....... ]
        } ........ ]
}...]
```

2. Building a Lemmatization Database

Figure 2:
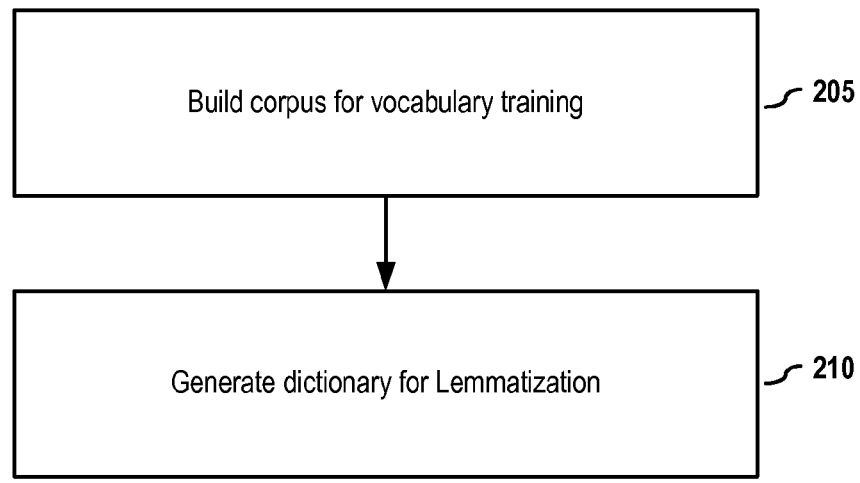
FIG. 2 depicts a method for creating a query transformation index or database for an NLP system according to embodiments of the present invention.

FIG. 2 depicts a method for building a query transformation index or database for an NLP system according to embodiments of the present invention.

a) Build Corpus for Vocabulary Training

In embodiments, the method comprises building (205) a corpus for vocabulary training. In embodiments, a support corpus "S" is used, which may comprise one or more of the following items:

(1) network certification examination training materials;
(2) books, including e-books, on supported vendor products;
(3) Wikipedia articles classified as "Network Architecture";
(4) RFCs linked to the Wikipedia articles;
(5) CLI configuration documents; and
(6) websites.

One skilled in the art shall recognize that other materials relevant to various devices may be included in the support corpus.

b) Generate Dictionary for Lemmatization

Figure 3:
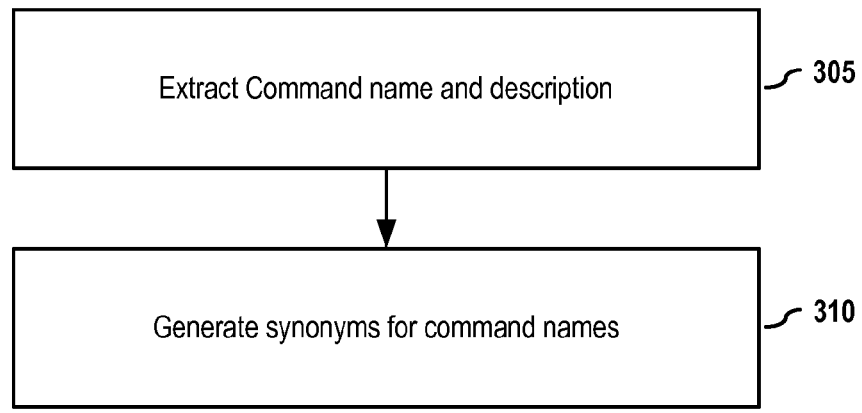
FIG. 3 depicts a method for building a lemmatization database according to embodiments of the present invention.

Returning to FIG. 2, in embodiments, a dictionary for lemmatization is generated (210). FIG. 3 depicts a methodology that may be employed for generating a lemmatization dictionary.

FIG. 3 depicts a method building a lemmatization database according to embodiments of the present invention. In embodiments, the methodology comprises two main steps: (1) extracting (305) Command names and descriptions, and (2) generating (310) synonyms for Command names.

(i) Extract Command Names and Corresponding Descriptions

In embodiments, the following techniques may be used to extract keywords, such as the Command names, for the domain. In embodiments, a domain shall be understood to mean, depending upon context, a target technical area (e.g., networking, storage, data center, enterprise, campus, etc.), a target device, a target vendor, and the like. First, the "Glossary" section of certification training documents and e-books may be used to obtain keywords. The Glossary sections also typically contain descriptions related to those keywords and that information may also be extracted. And second, in embodiments, a simple topic extraction technique, such as spidering and scraping, is used to obtain headers of Wikipedia pages marked as headers "networking term." Descriptions almost always follow the headers in the Wikipedia articles; and therefore, that information may also be extracted.

(ii) Generate Synonyms for Command Names (1) Generate Work Vectors

Figure 4:
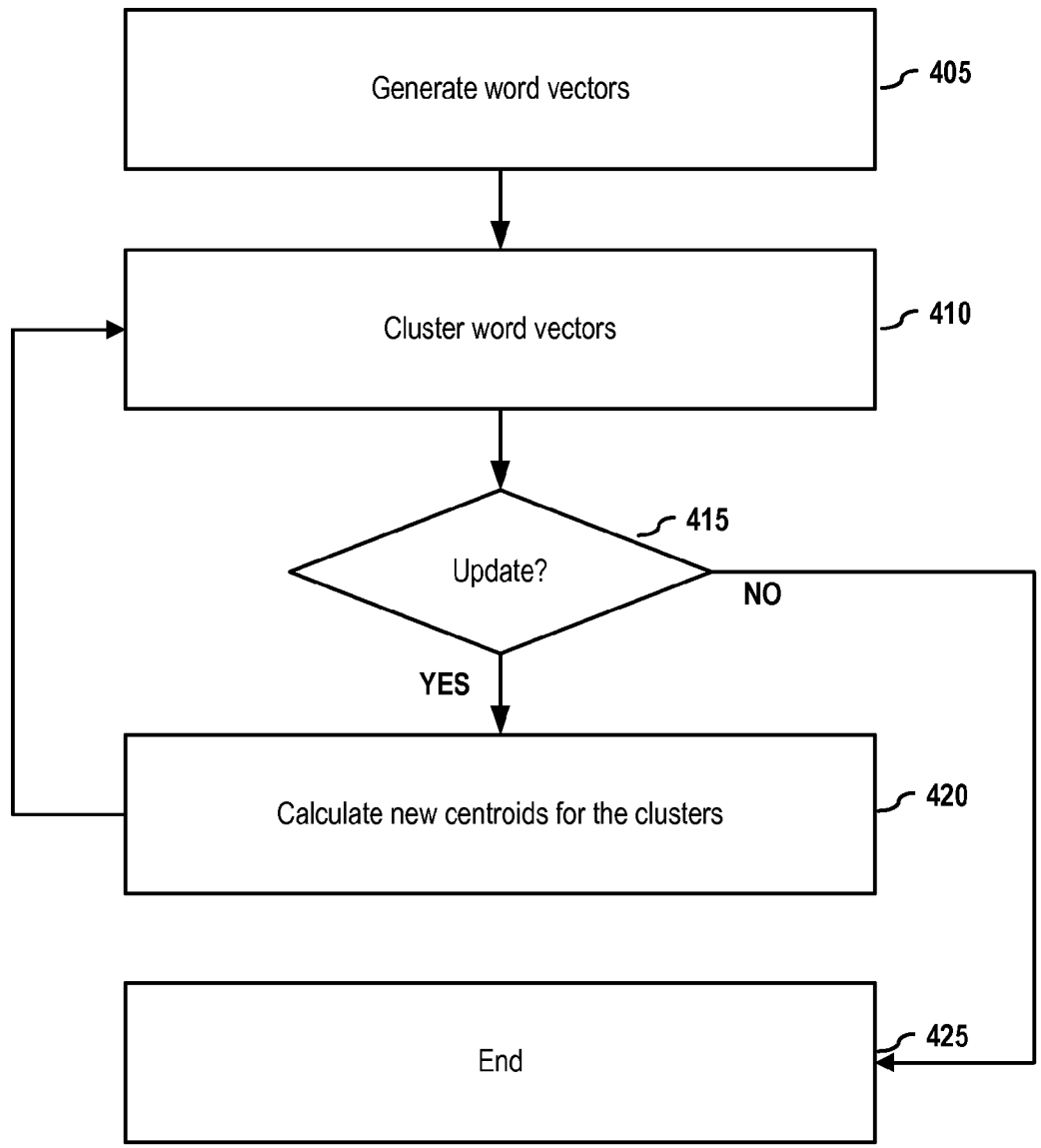
FIG. 4 depicts a method for building synonyms for command names according to embodiments of the present invention.

FIG. 4 depicts a method for building synonyms for command names according to embodiments of the present invention.

In the embodiment depicted in FIG. 4, the method commences by generating (405) word vectors. In embodiments, the vectors may be learned using a feedforward neural network, which is a classification algorithm that passes an input through several layers of processing units until reaching an output layer (deep learning), which are well known to those in the art. An open-source tool, known as Word2Vec (available at code.google.com/p/word2vec/) may be used to generate these word vectors.

In embodiments, the Word2Vec tool may be used to take the support corpus as input and produces the word vectors as output. In embodiments, the vector representation of Word2Vec tool may have the following properties:

(a) Words which are used in similar contexts are closer to each other.

(b) The word vector produced by Word2Vec retains many linguistic regularities (latent semantics) between words. For example, vector("LAG")−vector("Dell")+vector("Cisco") is close to vector ("port-channel") and hence was identified as a candidate for query/input transformation.

(c) Usage details—in embodiments, the Word2Vec tool was used with the following options:

(i) Training model=skip-gram;
(ii) Size of the NN (neural net) layers=10 s to 100 s (typically, larger value require larger training datasets); and
(iii) skip-window size=2.

One skilled in the art shall recognize that different settings and different methodologies may be used to obtain word vectors, and no particular settings or particular methodology is critical to the present invention.

(2) Cluster Word Vectors

Returning to FIG. 4, in embodiments, having obtained word vectors, the word vectors are clustered (410) to recognize synonyms. In embodiments, a clustering methodology may be used to discover synonym candidates. In embodiments, a K-means clustering algorithm may comprise the following steps.

First, the cluster centroids are initialized. For example, in embodiments, each word-vector from the Dell corpus (which is a subset of the Support corpus, which is sourced from Dell documentation) is selected. A set of these Dell word-vectors may be assigned as the initial centroids for the K-means algorithm. In embodiments, the "vendor" vector is subtracted from each of the word vectors generated from the Dell corpus.

Word-vectors are then assigned to clusters. In embodiments, word-vectors may be assigned to a cluster by randomly selecting each word-vector from the support corpus, subtract the corresponding "vendor" vector from the word vector (for example, if the word is picked from a Cisco document, the vector corresponding to "Cisco" is subtracted from the vector), and assigning it to the cluster closest to that word-vector.

In embodiments, the Euclidean distance between the vectors may be used to as the distance measure. For example, if C is a centroid in n-dimensional space (i.e., $C=(c_1, c_2, \ldots c_n)$) and X is a word-vector point in n-dimensional space (i.e., $X=(x_1, x_2, \ldots x_n)$), the Euclidean distance between the centroid and the word-vector may be given by:

$$E = \sqrt{\sum_{i=1}^{n} (c_i - x_i)^2}$$

In embodiments, the Euclidean distances between X and each of K centroids are calculated and the centroid that has the closest distance to X is selected. For example, if there are K centroids (i.e., $K=\{C_1, C_2, \ldots C_K\}$, then the distance between the word-vector X and each of the K centroids is found (i.e., $\{E(C_1,X), E(C_2,X), \ldots, E(C_K,X)\}$), and the word-vector X is assigned to the centroid with the minimum value of E in the above set.

In embodiments, a determination may be made (415) whether to update the clusters based upon one or more factors. In embodiments, the factors may include number of update cycles completed, number of word-vectors being changed to a different cluster from an iteration being below a threshold level, or the like. One skilled in the art shall recognize that a number of factors may be used and such factors fall within the scope of the present disclosure.

In embodiments, if an update to the clusters is desired, new centroids for the clusters are calculated (420). For example, in embodiments, new centroids may be calculated by taking an average of all points belonging to that cluster. That is, each dimension of the new centroid is constructed by summing that dimension from all points belonging to the cluster (which may include the centroid) and dividing the sum by number of points in the cluster. Thus, in embodiments, a new centroid, C', given a cluster with r points $(X_1, \ldots X_r)$ and a centroid, C, may be determined according to the following:

$$C' = \frac{C + \sum_{i=1}^{r} X_i}{(r+1)}$$

Alternatively, a new centroid may be computed without including the centroid value. For example, in embodiments, given a cluster with r points $(X_1, \ldots X_r)$, a new centroid, C', may be determined according to the following:

$$C' = \frac{1}{r} \sum_{i=1}^{r} X_i$$

One skilled in the art shall recognize that a number of different methods may be used to recalculate the centroid and such methods fall within the scope of the present disclosure.

With new centroids calculated, the word-vectors may again undergo clustering (410).

In embodiments, this process may be iterated until a determination is made (415) not to update the clusters, which represents an end of the clustering process. At this stage, the points in a cluster are considered to be synonym candidates. In embodiments, statistical outliers may be detected and removed using, for example, one or more data-visualization tools.

c) Building the Command Template Database

Figure 5:
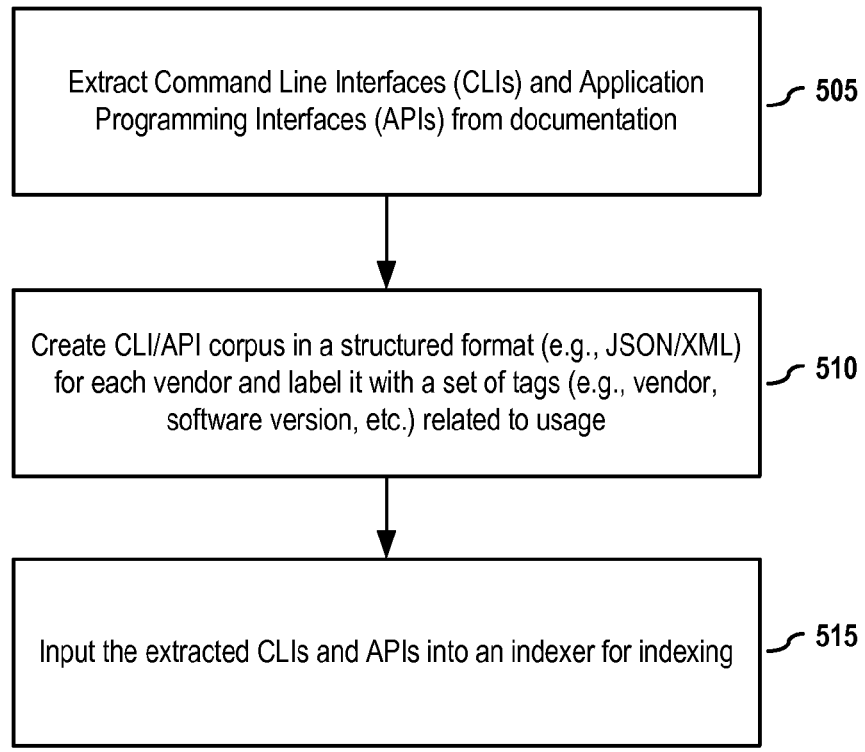
FIG. 5 depicts a method for building a command template database according to embodiments of the present invention.

In embodiments, a command template database (DB) is consulted by the NLP system to lookup a command template for the particular target platform (e.g., Vendor A device X, Vendor B device Y, or Vendor C device Z), which is a closest match to the NLP input. In embodiments, a term frequency-inverse document frequency (TF/IDF)-based ranking function is used to get the most relevant match for a transformed NLP input. In embodiments, the APACHE LUCENE index engine may be used to index CLIs and APIs (such as REST APIs, for example) for template lookup. FIG. 5 depicts an example of a method for building a command template database according to embodiments of the present invention.

(i) CLI and API Extraction

As shown in embodiment depicted in FIG. 5, the process commences by extracting (505) Command Line Interfaces (CLIs) and Application Programming Interfaces (APIs) from documentation. In embodiments, manual, semi-manual (using regular expressions, python, etc.), automatic methods, or combinations thereof may be used to extract CLIs and REST APIs from documentation, such as configuration guides and other source materials. For example, use font type and/or size and known precursor statement (e.g., <word>#, | for options, [ ] or ( ) for options) of the command-syntax to extract command features. In embodiments, copying and pasting CLI definition tables from portable document format (PDF) files into CLI definition files tended to be more accurate than statistical models. However, one skilled in the art shall recognize that there are many ways in which to "mine" content, such as tables and other multi-column structures, from PDF and other documentation files in a deterministic way, and such approaches may be utilized herein.

(ii) CLI and API Indexing

Returning to FIG. 5, in embodiments, for each vendor a CLI corpus is created (510) in a structured format (e.g., JavaScript Object Notation (JSON)/Extensible Markup Language (XML)) and it is labelled with one or more tags. In embodiments, the tags may include such things as vendor, switch software version, and other markers of where and/or how this command set is used. The extracted CLIs and APIs may then, in embodiments, be inputted (515) into an indexer, such as LUCENE, for indexing to create one or more indexes of the target-specific command templates. It shall be noted that this is trivial from the LUCENE API point of view, in which the path to the JSON/XML documents are passed to the LUCENE Index API. The output is a set of indexes. These indexes may be used as part of a lookup when the NLP system wants to match the most relevant command object to the natural language input. Embodiments of the lookup process are explained in the next section.

C. NLP Query Lookup

Figure 6:
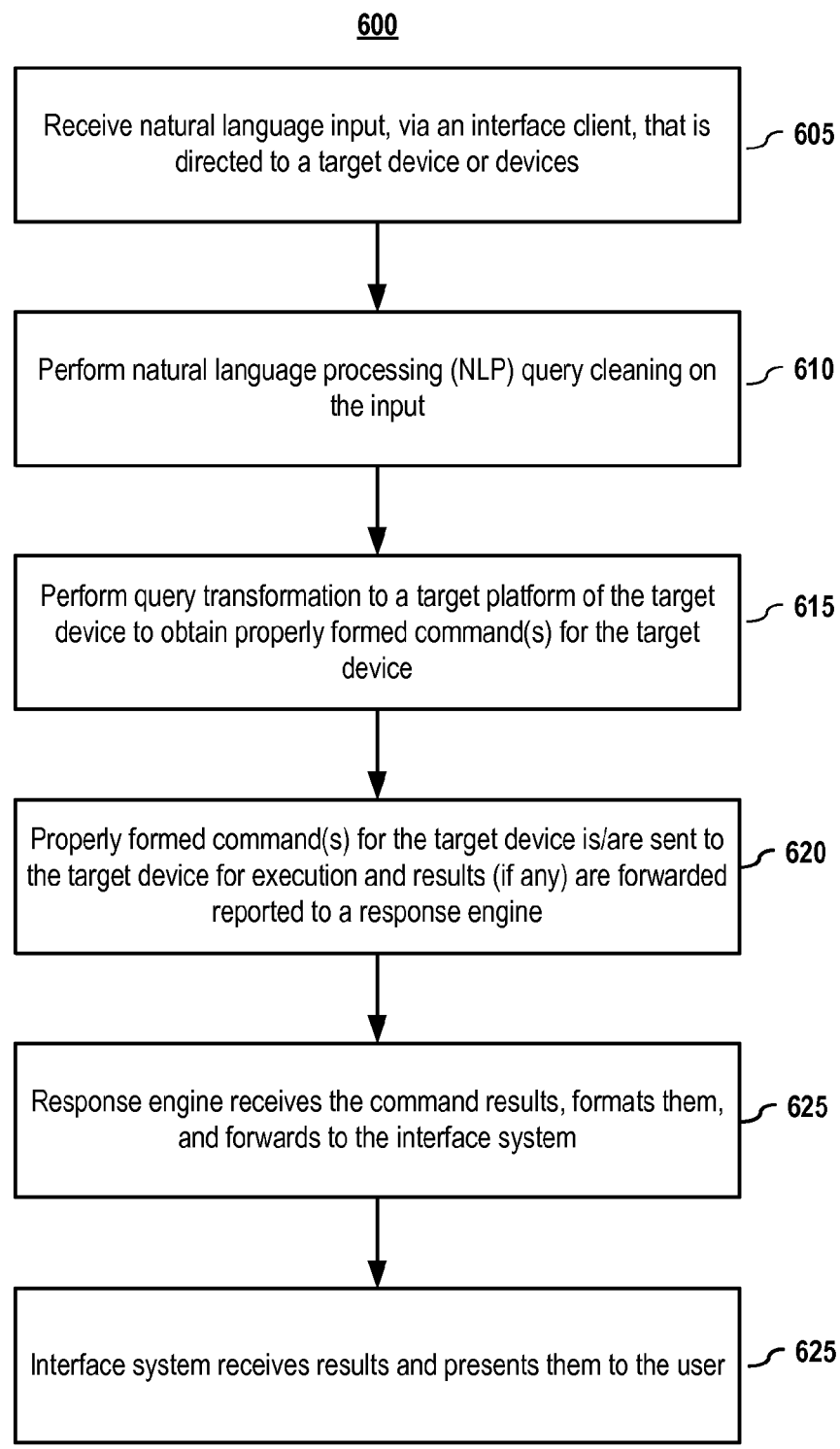
FIG. 6 depicts a method for performing a natural language processing (NLP) query look-up according to embodiments of the present invention.
Figure 7A:
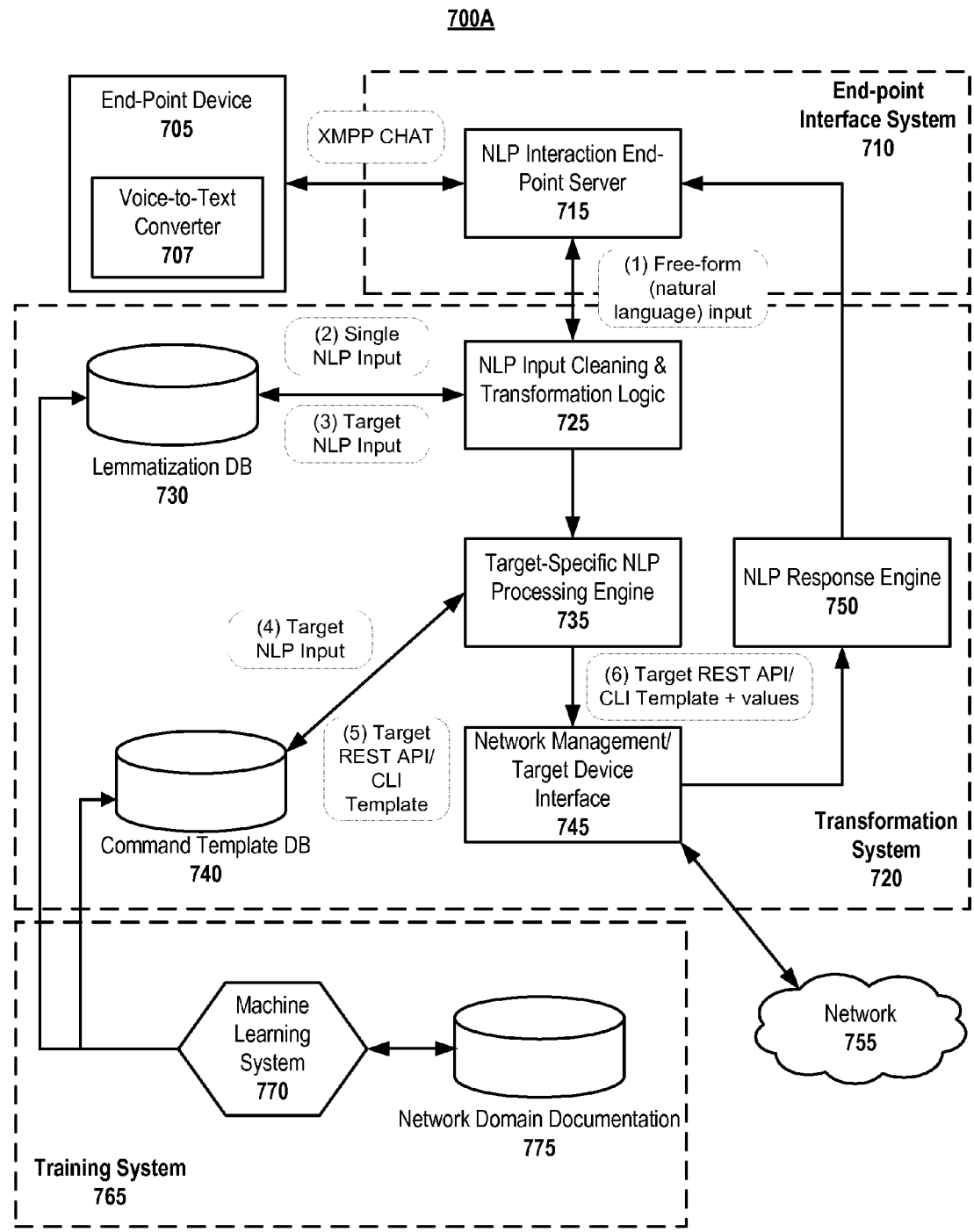
FIG. 7A depicts a block diagram of an NLP system according to embodiments of the present invention.
Figure 7B:
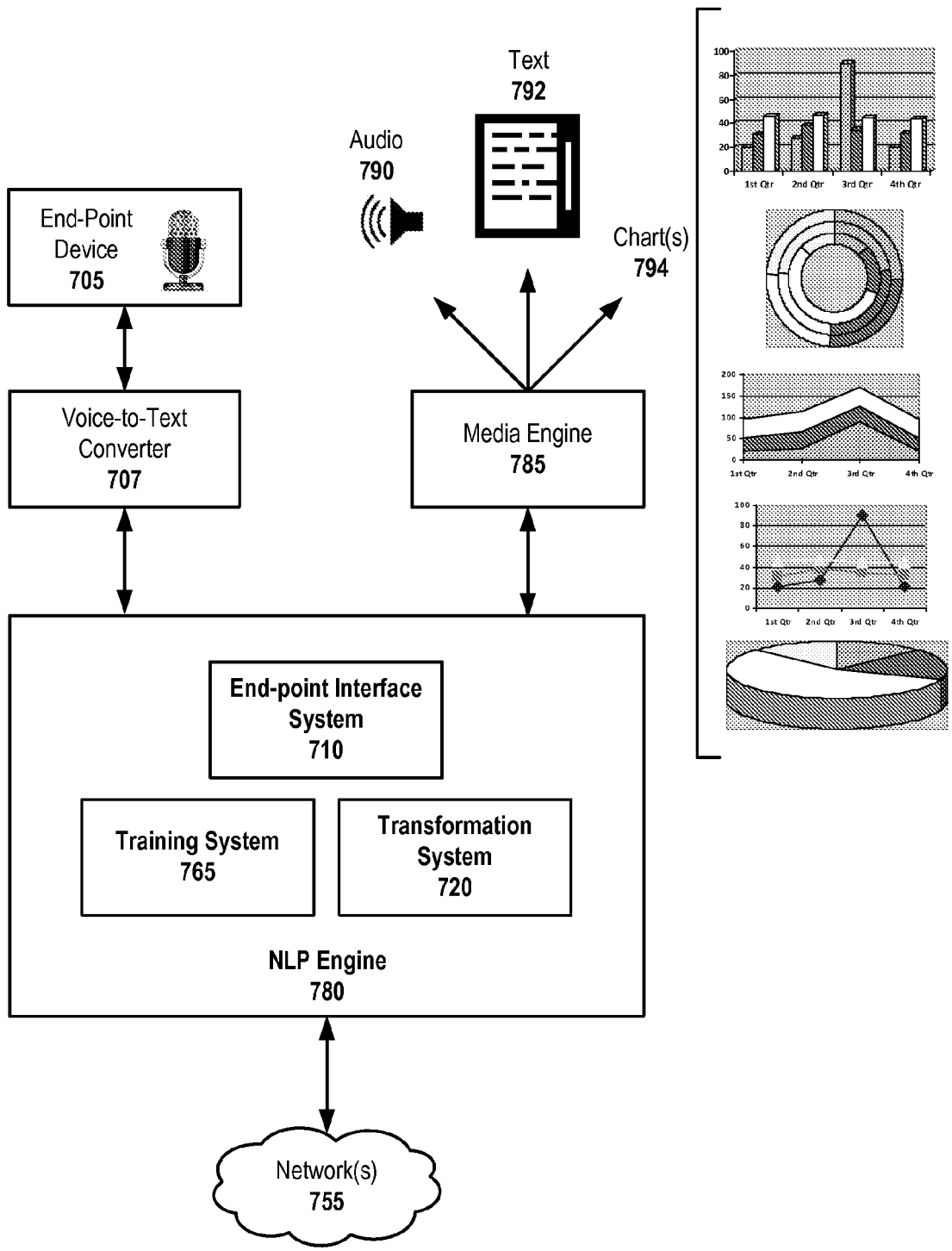
FIG. 7B depicts a block diagram of an alternative embodiment of an NLP system according to embodiments of the present invention.

Embodiments of natural language processing query/input lookup are presented below. To help facilitate explanation, embodiments of the lookup process are presented in combination with NLP system embodiments involved in the work-flow of a NLP input lookup. FIG. 6 depicts a method for performing a natural language processing (NLP) input lookup according to embodiments of the present invention. FIGS. 7A and 7B show simplified block diagrams of NLP systems according to embodiments of the present invention.

As shown in FIG. 7A, embodiments of an NLP system 700 comprise an end-point interface system 710, a transformation system 720, and a training system 765.

In embodiments, the end-point interface system 710 comprises an NLP interaction end-point server 715. In embodiments, the NLP interaction end-point server 715 interfaces with a user's computer system, such as a mobile device 705, in order to receive inputs from the user and to provide result data, if any, to the user.

In embodiments, the transformation system 720 may comprise an NLP input cleaning and transformation logic module 725, which is communicatively coupled to a lemmatization database 730 and a target-specific NLP processing engine module 735. As depicted in FIG. 7A, the target-specific NLP processing engine 735 may be communicatively coupled to a command template database 740 and a target device/network management interface module 745 (which may be part of the transformation system 720 or may be separate). In embodiments, the target device/network management interface module 745 is communicatively coupled to one or more networks 755, which comprise one or more devices to be configured, managed, and/or monitored using the NLP system 700. Also depicted in the embodiment shown in FIG. 7A, the network management transformation system 720 comprises an NLP response engine 750 that is communicatively coupled to the network management interface module 745 and receives results data and passes at least some of that data to the NLP interaction end-point server 715, which in turn transmits the data to the user's end-point device.

Finally, in embodiments, the NLP system 700 may include a training system 765, which may comprise a machine learning system 770 communicatively coupled to a database of documents 775. In embodiments, the machine learning system 770 generates the lemmatization database 730 and command template database 740 using the document datastore 775 and the methods previously described.

The functions performed by the various components and systems and their interactions shall be described in more detail below.

Turning now to FIG. 6, embodiments of performing a natural language processing (NLP) input look-up will be described in reference to FIGS. 7A and 7B.

1. NLP Query Forwarding

In embodiments, a user interfaces with the NLP system 700 via the NLP interaction end-point server 715. In embodiments, the user may interface via an XMPP chat-server using a voice-input chat client on her end-point device 705, which may be a mobile device. XMPP stands for Extensible Messaging and Presence Protocol, which is a communications protocol based on Extensible Markup Language (XML). In embodiments, the end-point device 705 includes one or more input sensors, such as a microphone, and a voice-to-text converter 707 that receives the audio input and converts it into text. In embodiments, the audio input may be recorded in an audio file, such as .wav or a compressed format. In embodiments, the voice-to-text converter 707 may be located within the end-point interface system 710, which receives audio data directly or indirectly from the end-point device. In either case, one skilled in the art shall recognize that converting voice to text is known in the art and may be readily used herein. In embodiments, the system may include a training feature or features to allow the system to become familiar with the user's voice, familiar with recognizing certain technical terms, or both.

In embodiments, the user may see the target device or devices as avatars on her chat client. For example, FIG. 8 depicts an embodiment of an NLP chat client interface according to embodiments of the present invention.

Figure 8:
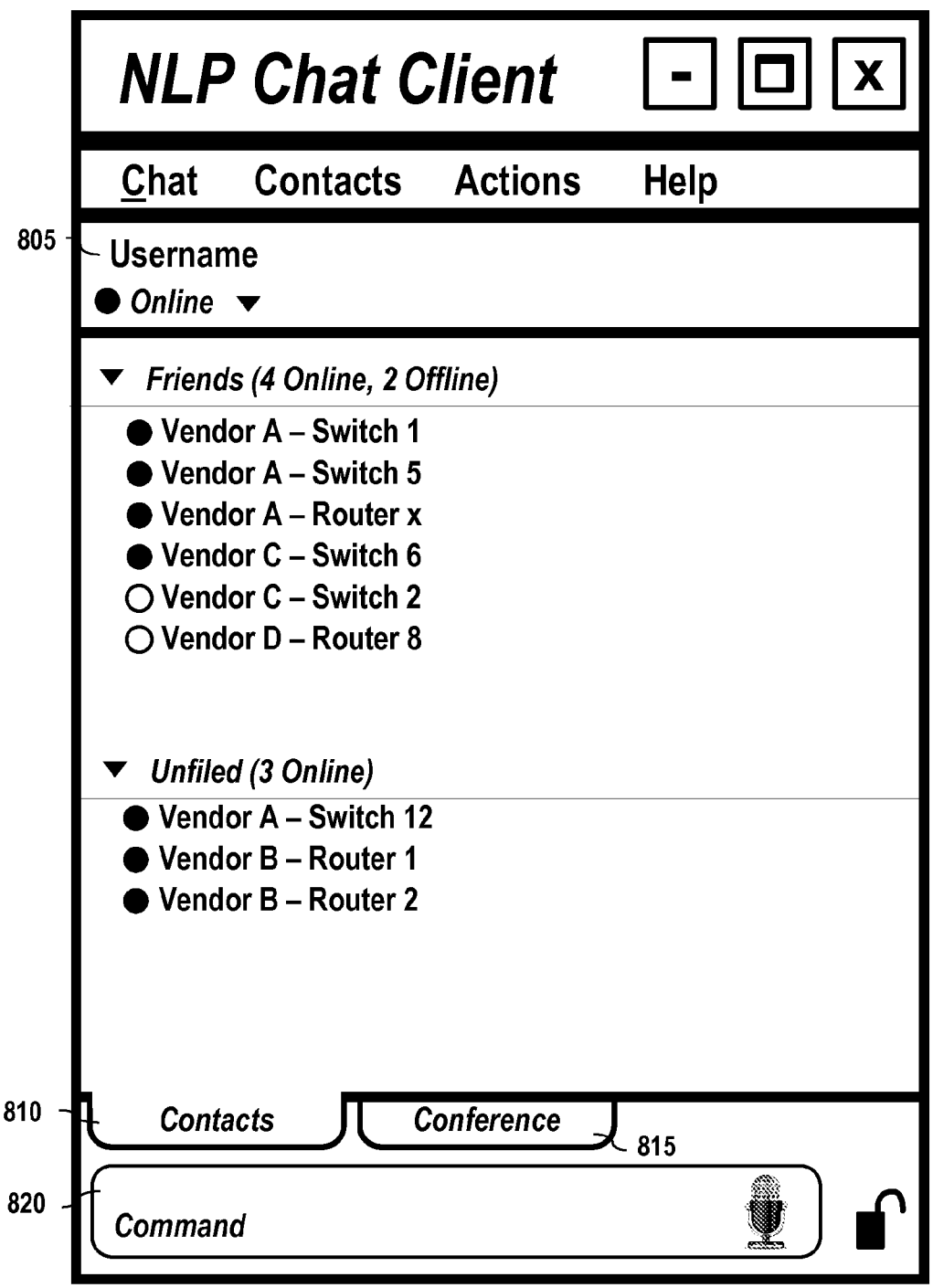
FIG. 8 presents an example NLP voice interface client according to embodiments of the present invention.

As shown in FIG. 8, the NLP chat interface 800 displays for a user client 805 a listing of contacts 810 that represent or are avatars for devices that can be configured, managed, or monitored via the interface 800. For example, the user may connect to a target switch avatar and issue an NLP query (or input, which may be used interchangeably with query herein), such as "create virtual-LAN 10 and add it on ports 1 and 2." In embodiments, a voice-to-text module converts the user's speech into text; and in embodiments, the client 800 may display the converted text in a command window 820. In embodiments, if the conversion was incorrect or if the user misspoke, the user can correct the text in the command window 820. In embodiments, the system may use corrected changes, whether audio or text, to improve the learning process.

It shall be noted that receiving inputs via a client such as this one allows the NLP system to leverage the features and benefits of the native interface application. For example, chat interfaces allow users to form sets of contacts into groups, can create conferences 815 with one or more devices, etc. Thus, one input can be sent to a set of devices thereby providing ease and efficiency for the user. And, as will be discussed in more detail below, since the NLP system will convert the natural language input into a domain-specific properly formed command input for each device, even if the devices in the group are different, they will receive the correct, properly formed command input.

Returning to FIG. 6, the NLP input command issued via the client on the end-point computing device 705 is received (605) by the NLP interaction end-point server 715. The server 715, which may be a chat server, forwards the command to the network management NLP translation system 720 to process the NLP input.

In embodiments, the NLP query cleaning and transformation logic module 725 receives NLP input from the server 715 and performs (610) NLP cleaning on the input. In embodiments, the cleaning may comprising performing one or more of the following steps:

(a) stemming the query to remove any plurals and reflexive pronouns; and (b) splitting compounds and complex statements into simple sentences.

For example, an input of "create virtual-LAN 10 and add it on ports 1 and 2" would yield an output of three individual commands, namely ["create virtual-LAN 10", "add virtual-LAN 10 on port 1", "add virtual-LAN 10 on port 2"].

In embodiments, the NLP query cleaning and transformation logic module 725 also performs conversion or transformation to the target platform. In embodiments, the natural language input command or commands in the free-form vocabulary are transformed performing the following. In embodiments, a single NLP input is looked up in the lemmatization database 730 to convert the free-form vocabulary in the single NLP input to the target device vocabulary. For example, the inputs from the prior example may be returned as: "create vlan 10", "add vlan 10 on interface 1", "add vlan 10 on interface 2". It should be noted that, in embodiments, the NLP system knows the type of device (e.g., make, model, vendor, etc.), which the NLP system may discover from interfacing with the device, may receive as input from an administrator when forming an avatar for device in the NLP system, or a combination thereof.

In embodiments, the target-specific processing engine module 735 further completes the conversion or transformation process. In embodiments, the target-specific processing engine module receives the target-specific input and performs a lookup in the command template database using the target-specific input to obtain a target-specific command template match, and responsive to the target-specific command template match having one more empty values, fills the one or more empty values from data obtained from the natural language input. For example, in embodiments, the target-specific processing engine module performs the following steps:

(a) In embodiments, the command template database 740 is queried to obtain the most relevant command template match for each expression in the transformed list of target NLP input(s). For example:

Input: ["create vlan 10", "vlan 10 on interface 1", "add vlan 10 on interface 2"]

Output: [["interface vlan< >", ["interface eth< >", "interface vlan< >"], ["interface eth< >", "interface vlan< >"]].

(b) In embodiments, analysis may be performed on one or more of the NLP input, target-specific NLP inputs, and command template list, and empty/variable slots in the template(s) in which values are expected are completed. In embodiments, temporal analysis may be performed so that commands, including preparatory actions, are performed and performed in the correct order. For example:

Inputs: ["create vlan 10", "vlan 10 on interface 1", "add vlan 10 on interface 2"] and ["interface vlan< >", ["interface eth< >", "interface vlan< >"], ["interface eth< >", "interface vlan< >"] ]

Output: ["interface vlan 10", ["interface eth 1", "interface vlan 10"], ["interface eth 2", "interface vlan 10"]

(c) In embodiments, the output command-chain generated above (i.e., the target-specific command or commands that are properly formatted and filled in) to the network management interface 745.

As noted previously, the network management interface 745 is communicatively coupled to via one or more networks 755 to the target device or devices. Thus, returning to FIG. 6, the network management interface sends (620) the properly formed command or commands for the target device(s) for execution by the device(s).

In embodiments, the network management interface 745 may also receive one or more sets of data from the target device(s) and may forward some or all of that data to an NLP response engine 750. And, in embodiments, the NLP response engine 750 receives the command results, formats them, and forwards (625) them to the NLP interaction end-point server 715. For example, in embodiments, if there are several pages of results data, the NLP response engine 750 may portion the results into a size and format appropriate for the output interface of the end-point device. Thus, if the end-point device is using a chat client with limited viewing space, the results may be formatted in a number of screens that allow the user to review one screen at a time, may allow the user to output the results to a file for later review or archiving, or both. Similarly, if the output is a voice or graphical, the results can be converted accordingly.

In any event, in embodiments, the command results received from the NLP response engine are forwarded from the end-point server 715 to the end-point device 705 of the user.

FIG. 7B depicts a simplified block diagram of an alternative NLP system according to embodiments of the present invention. As shown in FIG. 7B, an NLP engine 780 comprises end-point interface system 710, transformation system 720, and training system 765, which systems are the same or similar to those discussed above with reference to FIG. 7A. Also similar to the system in FIG. 7A, depicted in the embodiment in FIG. 7B is an end-point device 705 that includes a voice input sensor (e.g., microphone) and a voice-to-text converter 707. The input sensor receives a user's NLP input, and that audio input is converted to text, which is processed by the NLP engine 780, as previously discussed.

In embodiments, the system may also include one or more media engines 785 that receive the response data from the executed commands and may present that data in one or more multimedia formats, such as audio 790, text 792, and charts 794. One skilled in the art shall recognize that the functionality of the media engine 785 may be incorporated into one or more components of the system in FIG. 7A. For example, the media engine 785 functions may be performed by the NLP response engine 750, the NLP interaction end-point server 715, the end-point device 705, or any combination thereof. Furthermore, it shall be noted that the output may be presented to the user via the chat interface, such as that shown in FIG. 8, or via a different interface or interfaces.

Figure 9:
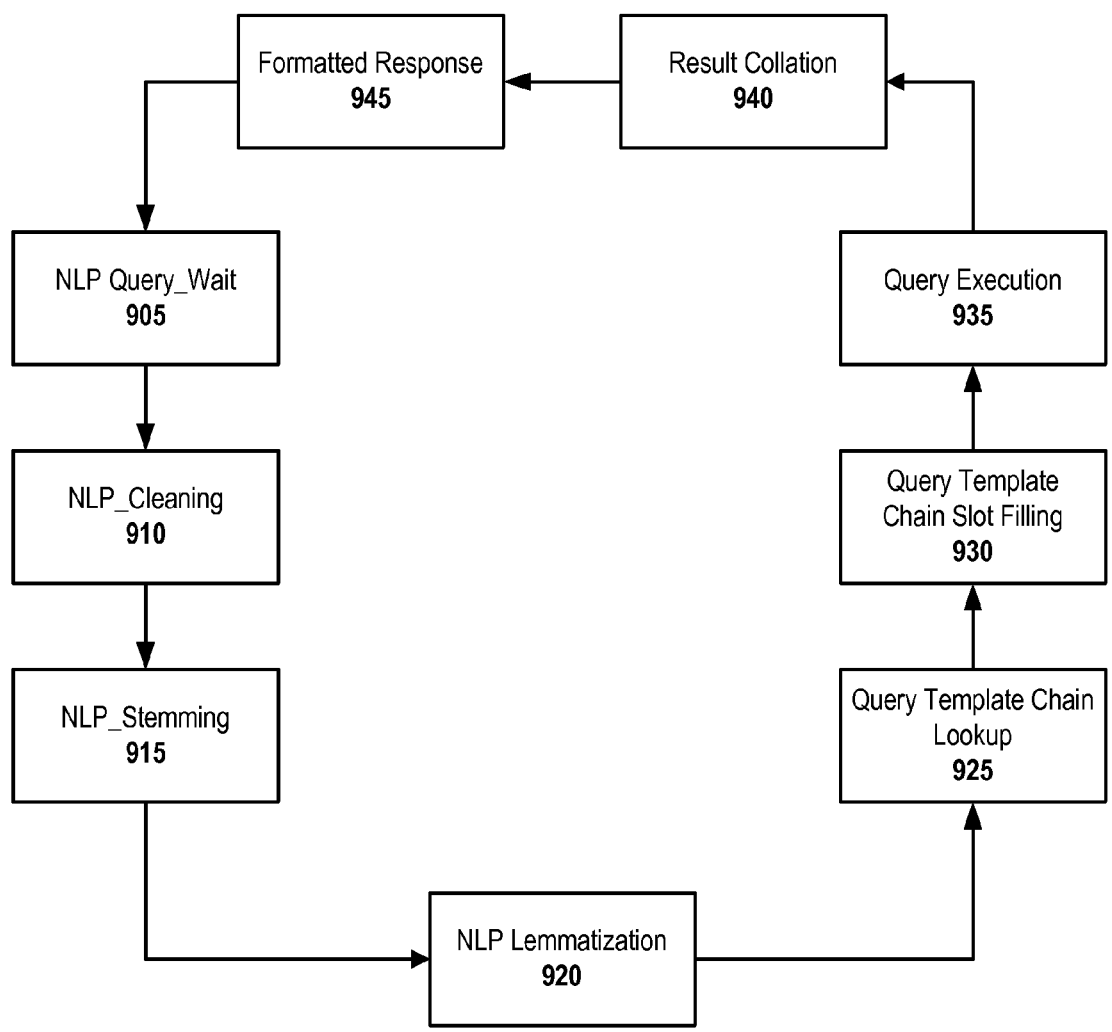
FIG. 9 depicts NLP query handling finite state machines according to embodiments of the present invention.

FIG. 9 depicts NLP query handling finite state machines according to embodiments of the present invention. The state machine diagram shows embodiments of the life cycle of a NLP query. As shown in FIG. 9, in embodiments, the finite state machines include:

NLP Query/Input_Wait 905, in which the system waits to receive a free-form input from a user;

NLP_Cleaning 910, in which the NLP input is split into simple inputs;

NLP_Stemming 915, in which plurals and reflexive pronouns are removed from the NLP input;

NLP Lemmatization 920, in which a lookup is performed in a lemmatization database to convert at least some of the free-form vocabulary of the cleaned natural language input into a target-specific input that comprises target-specific vocabulary that corresponds to the target device;

Query/Input Template Chain Lookup 925, in which the target-specific input is used to perform a lookup in a command template database to obtain a target-specific command template match for the target-specific input; and Query/Input Template Chain Slot Filling 930, in which, responsive to the target-specific command template match having one more empty values, the one or more empty values are filled from data obtained from the natural language input to obtain a properly formed (included having the appropriate values filled in) target-specific command;

Query/Input Command Execution 935, the properly formed target-specific command is submitted to the intended target device and is executed;

Result(s) Collation 940, in which a set of results from the execution of the properly formed target-specific command are received and compiled; and Formatted Response 945, in which at least some of the set of results from the execution of the properly formed target-specific command are formatted for the intended end-user interface type (e.g., voice, chat, mobile screen size, etc.).

D. System Embodiments

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 10:
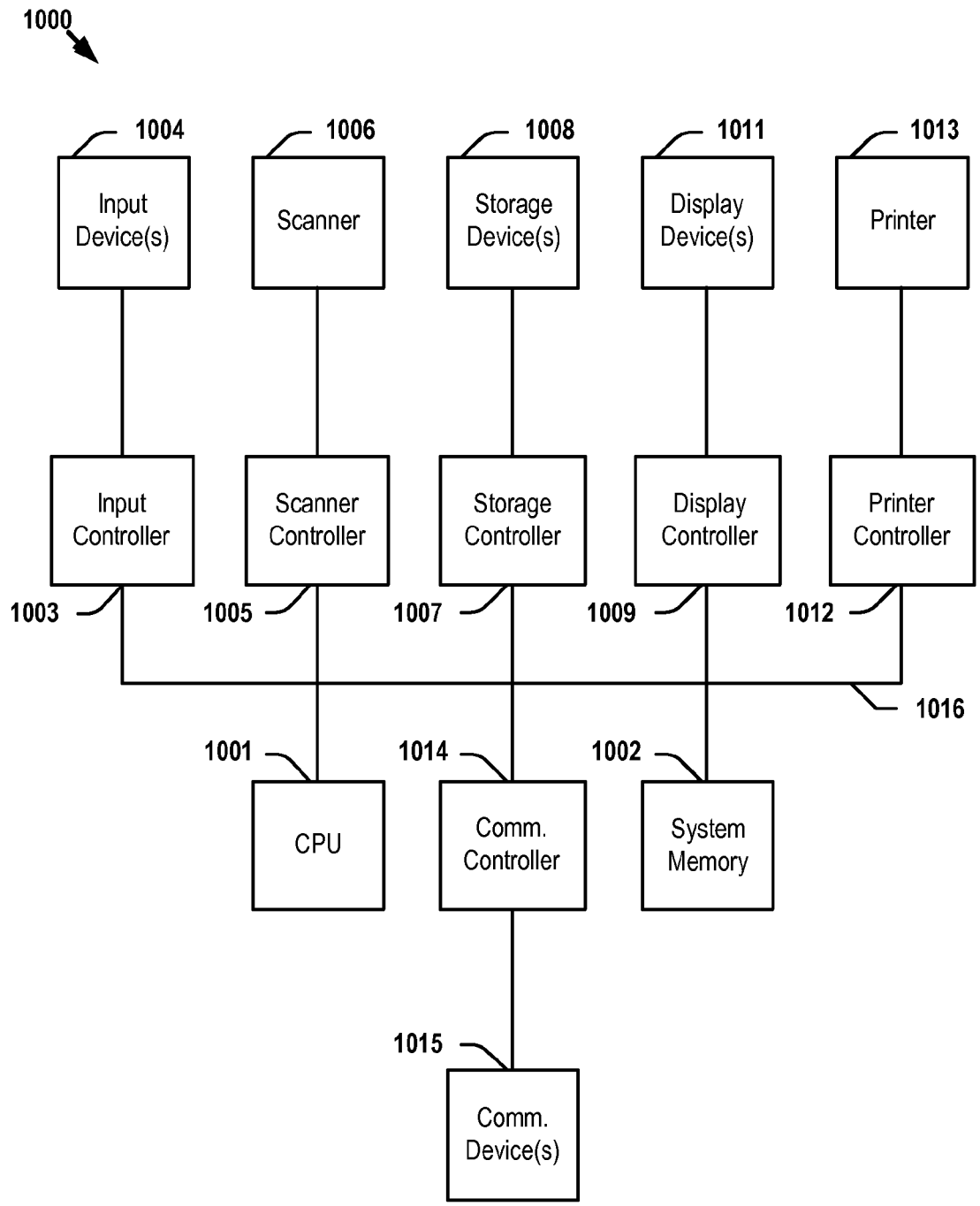
FIG. 10 depicts a simplified block diagram of an information handling system according to embodiments of the present invention.

FIG. 10 depicts a block diagram of an information handling system 1000 according to embodiments of the present invention. It will be understood that the functionalities shown for system 1000 may operate to support various embodiments of an information handling system—although it shall be understood that an information handling system may be differently configured and include different components. As illustrated in FIG. 10, system 1000 includes a central processing unit (CPU) 1001 that provides computing resources and controls the computer. CPU 1001 may be implemented with a microprocessor or the like, and may also include a graphics processor and/or a floating point coprocessor for mathematical computations. System 1000 may also include a system memory 1002, which may be in the form of random-access memory (RAM) and read-only memory (ROM).

A number of controllers and peripheral devices may also be provided, as shown in FIG. 10. An input controller 1003 represents an interface to various input device(s) 1004, such as a keyboard, mouse, or stylus. There may also be a scanner controller 1005, which communicates with a scanner 1006. System 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. System 1000 may also include a display controller 1009 for providing an interface to a display device 1011, which may be a cathode ray tube (CRT), a thin film transistor (TFT) display, or other type of display. The computing system 1000 may also include a printer controller 1012 for communicating with a printer 1013. A communications controller 1014 may interface with one or more communication devices 1015, which enables system 1000 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for converting a natural language input into a command input for a target device comprising:
   converting an audio input into text comprising a natural language input, at least a portion of the natural language input being intended for a target device from among a plurality of potential target devices that requires commands to be properly formed for the target device to be executed;
   performing natural language processing (NLP) input cleaning on the natural language input; and
   performing input transformation on at least a portion of the cleaned natural language input to convert the cleaned natural language input into one or more properly formed commands that are target-specific for the target device by performing the steps comprising:
      performing a lookup in a lemmatization database to convert at least some of the cleaned natural language input to a target-specific input that comprises target-specific vocabulary that corresponds to the target device; and
      using the target-specific input to perform a lookup in a command template database to obtain a target-specific command template match corresponding to the target-specific input that comprises target-specific vocabulary, the target-specific command template being used to create at least one of the one or more properly formed commands.

2. The computer-implemented method of claim 1 wherein the step of performing natural language processing (NLP) input cleaning on the natural language input comprises performing one or more of the steps comprising:
   responsive to the natural language input having plurals or reflexive pronouns, stemming the natural language input to remove any plurals and reflexive pronouns; and
   responsive to the natural language input comprising compound statements, complex statements, or both, splitting the natural language input into two or more simple natural language inputs.

3. The computer-implemented method of claim 1 further comprising:
   responsive to the target-specific command template match having one or more empty values, filling the one or more empty values from data obtained from the natural language input to obtain a properly formed target-specific command.

4. The computer-implemented method of claim 1 further comprising:
   receiving the natural language input via a messaging application.

5. The computer-implemented method of claim 4 further comprising the step of:
   presenting to a user via the messaging application one or more avatars corresponding to one or more target devices, which can be communicated with via the messaging application.

6. The computer-implemented method of claim 1 further comprising the step of:
   submitting the one or more properly formed target-specific commands to the target device for execution.

7. The computer-implemented method of claim 6 further comprising:
   receiving a set of results from the target device after execution of the one or more properly formed target-specific commands; and
   formatting at least some of the results from the set of results for presentation to a user.

8. A natural language processing (NLP) system for converting a natural language input into a target-specific command input for a target device, the system comprising:
   an audio sensor for receiving audio input from a user;
   a voice-to-text converter, communicatively coupled to the audio sensor, that converts the audio input from the user into text comprising a natural language input;
   an end-point interface system comprising a natural language processing (NLP) interaction end-point server that receives the natural language input from the user, the natural language input being intended for a target device from among a plurality of potential target devices;
   a transformation system that cleans the natural language input and transforms at least a portion of the cleaned natural language input into one or more properly formed commands that are target-specific for the target device, the transformation system comprising:
      an NLP input cleaning and transformation logic module, which is communicatively coupled to the end-point interface system to receive the natural language input and is communicatively coupled to a lemmatization database, that performs a lookup in the lemmatization database to convert at least some of the natural language input into a target-specific input corresponding to the target device; and
      a target-specific NLP processing engine module, which is communicatively coupled to the NLP input cleaning and transformation logic module and to a command template database, that performs a lookup in the command template database using the target-specific input to obtain a target-specific command template match for creating at least one of the one or more properly formed commands; and
      a target-device interface module that communicates the one or more properly formed commands to the target device for execution by the target device.

9. The natural language processing (NLP) system of claim 8 wherein the target-specific NLP processing engine module is further configured to:
   responsive to the target-specific command template match having one or more empty values, fill the one or more empty values from data obtained from the natural language input to obtain at least one of the one or more properly formed commands that are target-specific for the target device.

10. The natural language processing (NLP) system of claim 9 wherein the lemmatization database comprises:

a collection of structured records having a list of commands and each command is associated with list of terms related to different devices, different vendors, or both that are considered synonyms.

11. The natural language processing (NLP) system of claim 9 wherein the command template database comprises:
target-specific command templates, each target-specific command template being in a structured format and having an associated set of one or more tags related to usage of the target-specific command template; and
one or more indexes of the target-specific command templates.

12. The natural language processing (NLP) system of claim 9 further comprising:
a training system that is communicatively coupled to the one or more sets of target-related documentation and that uses the target-related documentation to develop the lemmatization database and the command template database.

13. The natural language processing (NLP) system of claim 8 further comprising:
an NLP response engine that is communicatively coupled to the target device interface module and that receives results data related to at least one of the one or more properly formed commands.

14. The natural language processing (NLP) system of claim 8 further comprising:
a media engine that receives results data related to at least one of the one or more properly formed commands and formats at least some of the results data for presentation to the user into one or more of a plurality of formats.

15. A non-transitory computer-readable medium or media comprising one or more sequences of instructions which, when executed by at least one processor, causes steps to be performed comprising:
converting an audio input into text comprising a natural language input, at least a portion of the natural language input being intended for a target device from among a plurality of potential target devices that requires commands to be properly formed for the target device to be executed;
performing natural language processing (NLP) input cleaning on the natural language input; and
performing input transformation on at least a portion of the cleaned natural language input to convert the cleaned natural language input into one or more properly formed commands that are target-specific for the target device by performing the steps comprising:
performing a lookup in a lemmatization database to convert at least some of the cleaned natural language input to a target-specific input that comprises target-specific vocabulary that corresponds to the target device; and
using the target-specific input to perform a lookup in a command template database to obtain a target-specific command template match corresponding to the target-specific input that comprises target-specific vocabulary, the target-specific command template being used to create at least one of the one or more properly formed commands.

16. The non-transitory computer-readable medium or media of claim 15 wherein the step of performing natural language processing (NLP) input cleaning on the natural language input comprises performing one or more of the steps comprising:
responsive to the natural language input having plurals or reflexive pronouns, stemming the natural language input to remove any plurals and reflexive pronouns; and
responsive to the natural language input comprising compound statements, complex statements, or both, splitting the natural language input into two or more simple natural language inputs.

17. The non-transitory computer-readable medium or media of claim 15 further comprising:
responsive to the target-specific command template match having one or more empty values, filling the one or more empty values from data obtained from the natural language input to obtain a properly formed target-specific command.

18. The non-transitory computer-readable medium or media of claim 15 further comprising one or more sequences of instructions which, when executed by at least one processor, causes steps to be performed for generating one or more databases for use in converting a natural language input into one or more properly formed command inputs for a target device, the steps comprising:
generating a lemmatization database that comprise a collection of structured records having a list of commands and each command is associated with list of terms related to different devices, different vendors, or both that are considered synonyms; and
generating a command template database comprises:
target-specific command templates, each target-specific command template being in a structured format and having an associated set of one or more tags related to usage of the target-specific command template; and
one or more indexes of the target-specific command templates.

19. The non-transitory computer-readable medium or media of claim 18 wherein the step of generating a lemmatization database comprises the step of:
extracting command name and corresponding descriptions for a domain from a support corpus of documentation that include documentation across different devices, vendors, or both;
generating a set of word vectors from at least some of the support corpus documentation; and
clustering the set of word vectors into clusters in which a cluster represents word vectors that are deemed to be synonyms.

20. The non-transitory computer-readable medium or media of claim 18 wherein the step of generating a command template database comprises the step of:
extracting target-specific command templates from a set of documentation;
generating a target-specific command templates corpus in a structured format and label each target-specific command template with an associated set of one or more tags related to usage of the target-specific command template; and
indexing the target-specific command templates corpus.

* * * * *